United States Patent [19]

Acona et al.

[11] Patent Number: 5,183,165
[45] Date of Patent: Feb. 2, 1993

[54] KITCHEN STORAGE UNIT

[75] Inventors: Bruce Acona; Jane Ancona, both of New York, N.Y.

[73] Assignee: M. Kamenstein, Inc., White Plains, N.Y.

[21] Appl. No.: 864,138

[22] Filed: Apr. 6, 1992

Related U.S. Application Data

[63] Continuation of Ser. No. 605,059, Nov. 2, 1990, abandoned.

[51] Int. Cl.⁵ ............................................. A47B 73/00
[52] U.S. Cl. ..................................... 211/77; 211/163; 211/74
[58] Field of Search .................... 211/83, 163, 77, 13, 211/71, 74, 131; D7/73; D6/457

[56] References Cited

U.S. PATENT DOCUMENTS

| | | | |
|---|---|---|---|
| D. 294,208 | 2/1988 | Noyes et al. | D6/457 |
| D. 299,402 | 1/1989 | Ancona et al. | D7/73 |
| D. 303,552 | 9/1989 | Ancona et al. | D19/77 |
| 938,809 | 11/1909 | Alexander et al. | 211/77 |
| 1,581,749 | 4/1926 | Mahony | 211/77 X |
| 1,732,131 | 10/1929 | Mahaffey | 211/77 |
| 1,756,883 | 4/1930 | Russell | 211/74 |
| 2,102,982 | 12/1937 | Taylor | 211/77 X |
| 3,275,159 | 9/1966 | James et al. | 211/163 X |
| 3,997,050 | 12/1976 | Patterson | 211/163 X |
| 4,140,223 | 2/1979 | Rau et al. | 211/78 |
| 4,216,067 | 8/1980 | Sturm | 211/77 |
| 4,609,975 | 9/1986 | Badolato et al. | 362/125 |
| 4,700,850 | 10/1987 | Morgan et al. | 211/163 X |
| 4,753,340 | 6/1988 | Blakeman et al. | 206/44.11 |
| 4,895,260 | 1/1990 | Ancona et al. | 211/77 |

Primary Examiner—Carl D. Friedman
Assistant Examiner—Korie Hung Chan
Attorney, Agent, or Firm—James A. Drobile; Robert A. Koons, Jr.; Robert E. Rosenthal

[57] ABSTRACT

Kitchen storage unit having a body, a top, hollow vertical members around a perimeter of the body, with apertures for receiving containers in columns in each hollow vertical member, and pegs extending from the body between the vertical members. The body may be rotatably mounted on a base. An opening in the top provides access to a receptacle in the interior of the body.

20 Claims, 3 Drawing Sheets

KITCHEN STORAGE UNIT

This is a continuation of copending application Ser. No. 07/605,059 filed on Nov. 2, 1990 now abandoned.

BACKGROUND OF THE INVENTION

This invention relates to holders and display racks for articles. This invention relates more particularly to holders and display racks for containers for food items. This invention relates especially to spice racks. This invention also relates to caddies for kitchen utensils.

Providing storage space in kitchens is a problem for many people. A large number of utensils and gadgets are acquired and frequently used. Accordingly, storage of such utensils and gadgets in a small space is desirable.

In addition to gadgets and utensils, various food items are used on a frequent basis. In particular spices are used frequently. Spices, and other non-perishable food items, are stored in containers, especially in cylindrical jars, which may be placed in racks especially designed for this purpose. Storage of such food items in a compact arrangement is desirable.

It is desirable to be able to locate kitchen items, including utensils, gadgets and food items, quickly. Accordingly, a kitchen storage arrangement that allows numerous kitchen items to be seen at a glance is desirable.

It is an object of this invention to provide an article for storage of various kitchen items.

It is also an object of this invention to provide an article for storage of various kitchen items, wherein such items are easily accessible.

It is a further object of this invention to provide an article for storage of containers.

It is a further object of this invention to provide an article for storage of containers together with kitchen utensils, gadgets, and the like, in a compact manner.

It is a further object of this invention to provide an article for storage of containers together with utensils and gadgets in a manner whereby they may be seen easily and occupy a minimum volume.

Further objects and advantages of this invention will become apparent from the description of the invention which follows.

SUMMARY OF THE INVENTION

A kitchen storage unit includes a body, vertical members on a perimeter of the body, each one of the vertical members including apertures for receiving containers, pegs extending from an upper portion of the kitchen storage unit, wherein no portion of any one of the apertures is beneath any one of the pegs, and a receptacle formed in the body and having an opening defined by a hole in a top surface of the body.

DETAILED DESCRIPTION OF A PREFERRED EMBODIMENT

Figure 1:
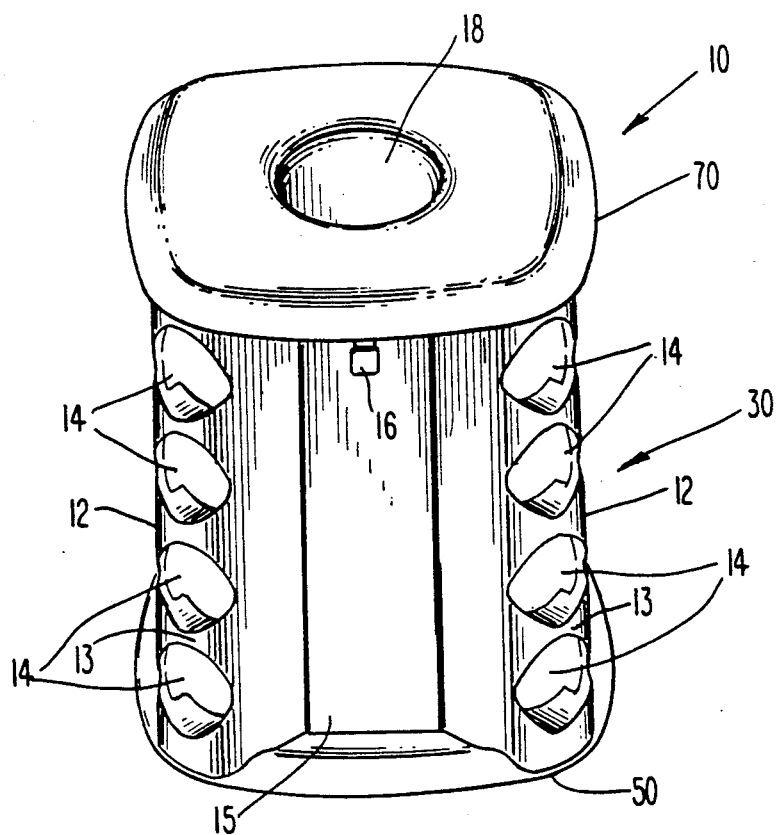
FIG. 1 is a perspective view of a kitchen storage unit according to the invention.
Figure 2:
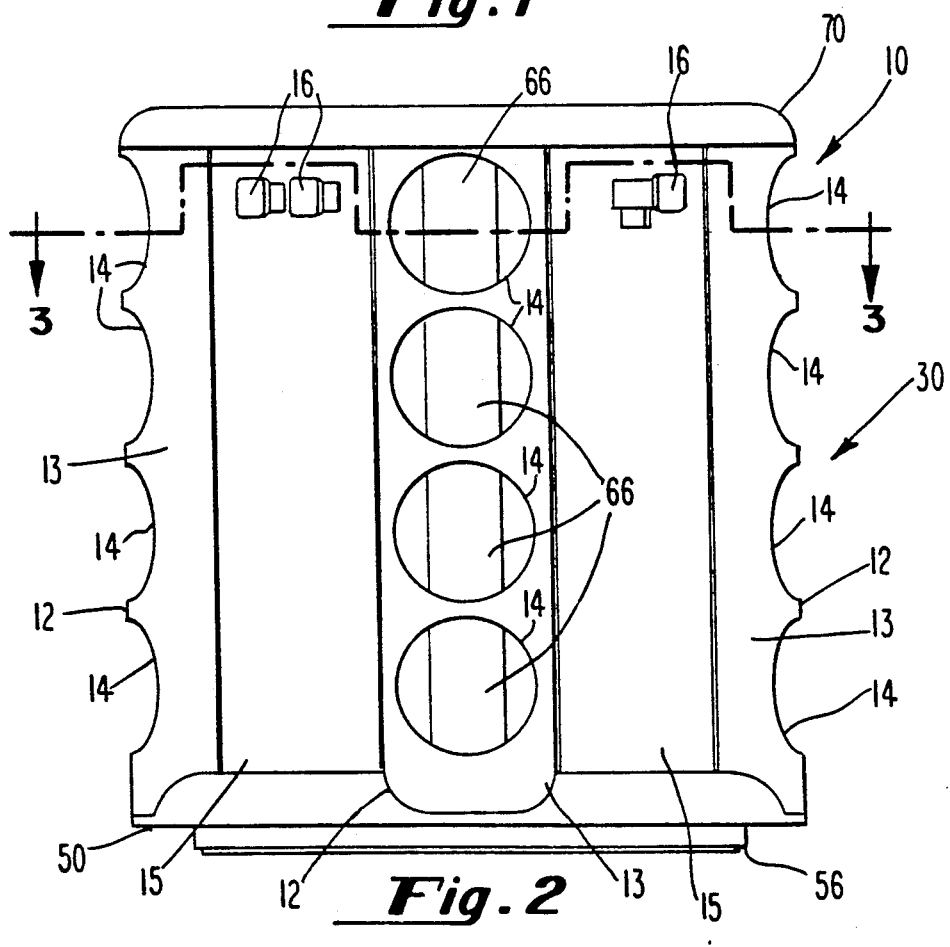
FIG. 2 is a front elevational view of a kitchen storage unit according to the invention

Referring to FIGS. 1 and 2, a kitchen storage unit 10 according to the invention is depicted Unit 10 has a base 56, a platform 50 resting on base 56, a body 30 resting on platform 50, and a top 70 on body 30.

Four vertical members 12 are disposed about the perimeter of body 30. These vertical members 12 may be spaced equidistant from one another about the perimeter of body 30, as shown. Two such vertical members 12 are visible in FIG. 1. Each vertical member has a wall 13. Each vertical member 12 has apertures 14 in wall 13. Each aperture 14 in the embodiment shown is circular In the embodiment shown, each vertical member 12 has a column of four apertures 14. Each vertical member 12 is substantially hollow. Accordingly, an object of the appropriate size and shape may be received in any one of apertures 14. In general, the shape of the aperture 14 will be the same as the shape of the containers to be placed in the apertures. Accordingly, a cylindrical spice jar may be inserted in each aperture In the embodiment shown in FIGS. 1 and 2, each vertical member extends substantially the entire height of the body 30. With reference to FIG. 2, there is provided a vertical planar surface 66 inward from each aperture 14. The bottom of an object inserted in an aperture 14 will rest against planar surface 66.

The perimeter of body 30, between each pair of vertical members 12, is composed of wall sections 15. Each wall section 15 is vertical and planar. A number of pegs 16 project horizontally from an upper portion of each wall section 15. A "peg," as used herein, is a member from which objects may hang. In the illustrated embodiment, either one or two pegs 16 project horizontally from each wall section 15. Because each wall section 15 is vertical, there is space provided below each peg 16, or pair of pegs 16. A kitchen utensil or the like may hang from each peg 16. Of course, pegs may be provided anywhere along an upper portion of the unit 10. For example, the pegs 16 may project from the wall 13 of vertical members 12 However, no peg 16 may be located directly over a circular aperture 14. It is desirable to provide clearance directly beneath and to each side of each peg 16, so that utensils may hang easily.

Top 70 defines a top surface of body 30. In the center of the body 30 there is a receptacle 18. This receptacle has an opening defined by an opening in the top surface of body 30, specifically in the center of top 70. Various kitchen utensils may be placed in receptacle 18. Receptacle 18 extends into the center of unit 10. Planar surfaces 66 may be provided on the exterior of receptacle 18. This provides excellent use of the available volume in the interior of unit 10.

Platform 50 may be rotatably mounted on base 56 This is desirable to provide easy access by a user to jars in apertures on all sides of the unit, and to utensils hanging from pegs on all sides of the unit.

Figure 3:
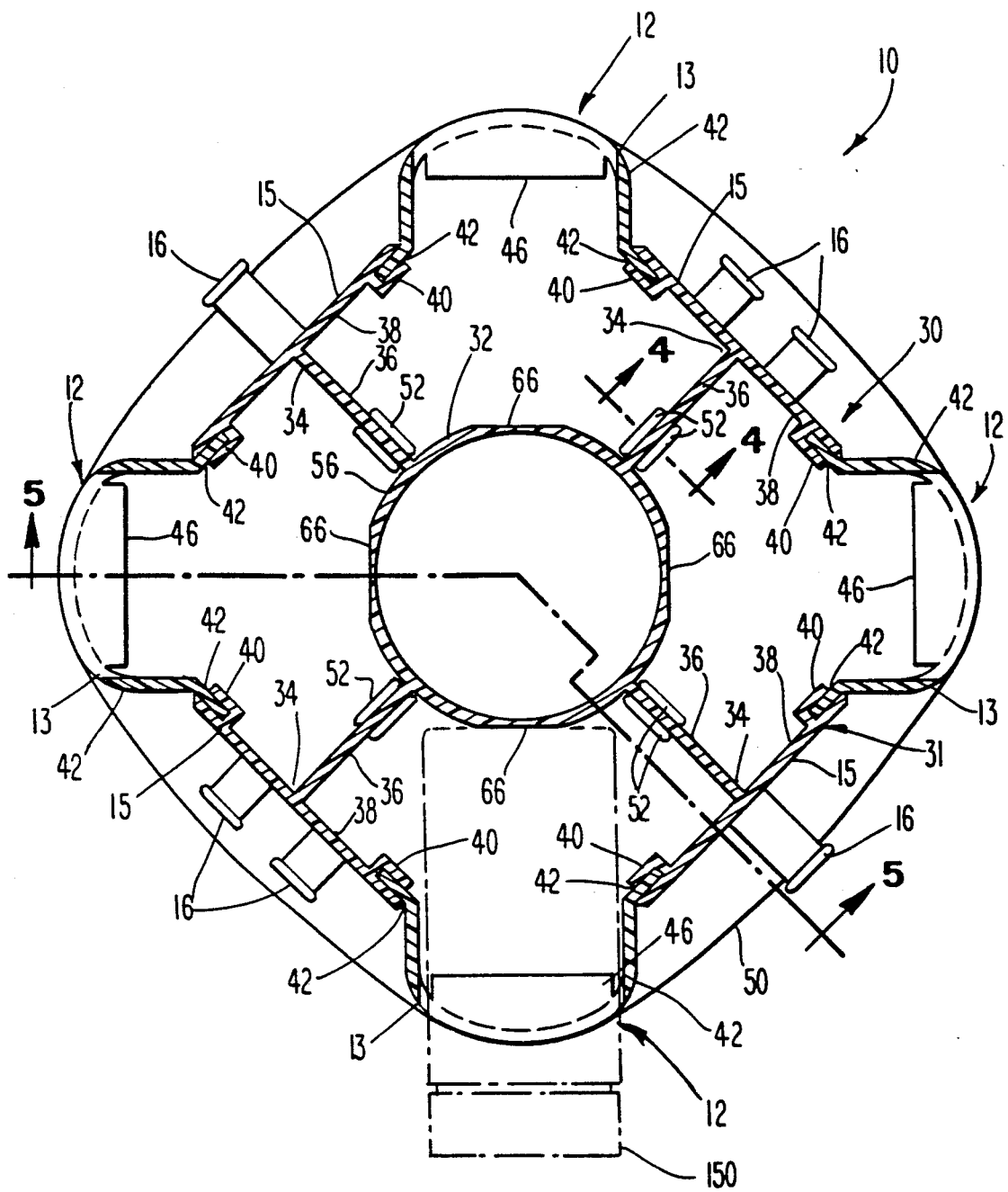
FIG. 3 is a cross-sectional view of a kitchen storage unit according to the invention along the line "3" in FIG. 2.
Figure 4:
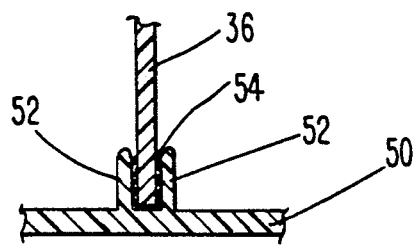
FIG. 4 is a partial cross-sectional view of a kitchen storage unit according to the invention along the line "4" in FIG. 3.
Figure 5:
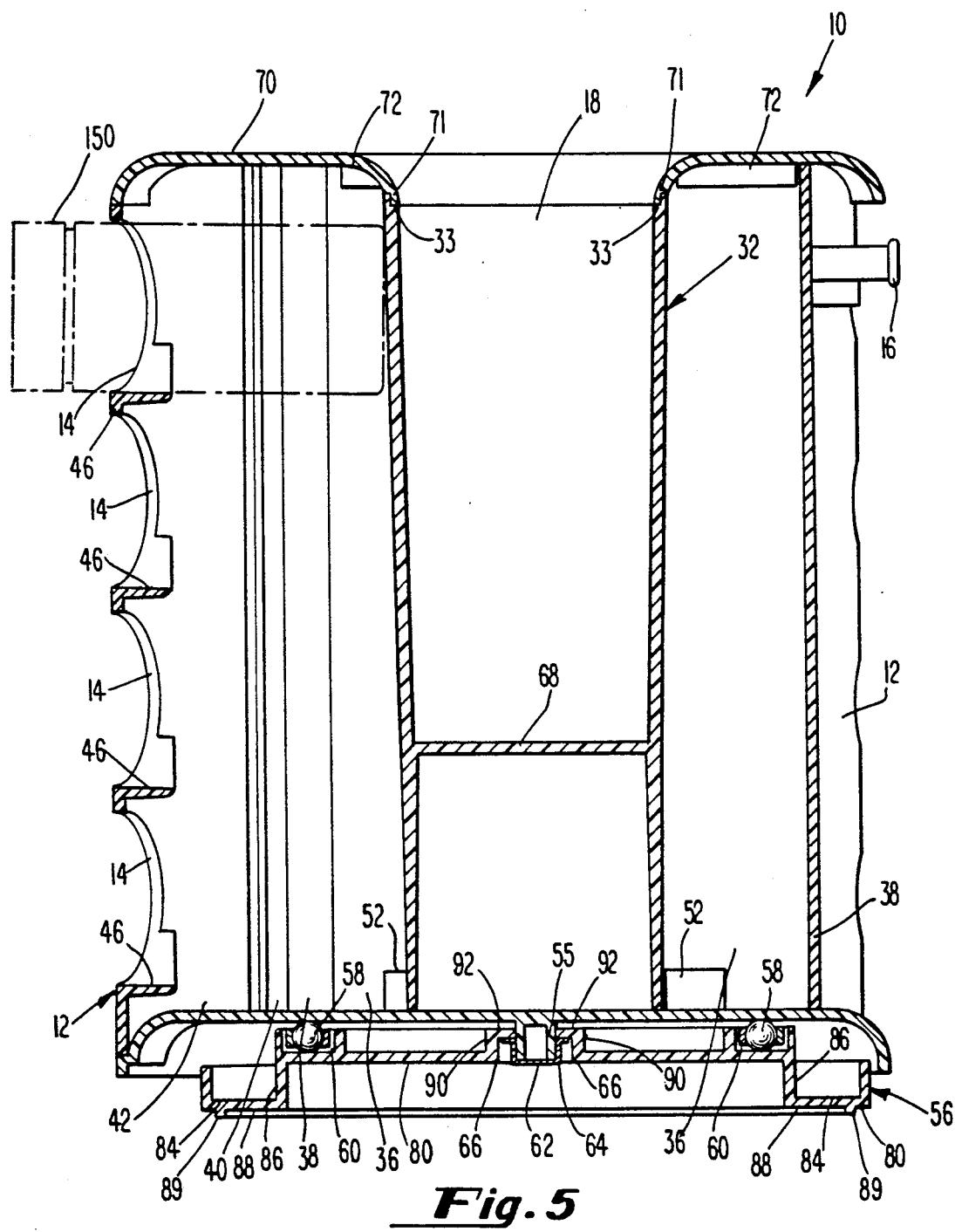
FIG. 5 is a cross-sectional view of a kitchen storage unit according to the invention along the line "5" in FIG. 3.

Further details of the construction of unit 10 may be seen with reference to FIGS. 3, 4, and 5.

With reference to FIG. 3, the construction of the body 30 of the unit 10 may be seen Body 30 includes a central piece 31 and four inserts 44. The central piece 31 defines the walls and bottom of receptacle 18, and wall sections 15 of body 30. The inserts 44 define the walls 13 of vertical members 12, including circular apertures 14.

Central piece 31 includes a vertical cylinder 32 in the center thereof. Four members 34 extend outward from cylinder 32. Each member 34 is substantially T-shaped in cross-section. Each T-shaped member 34 includes an upright 36 and a crosspiece 38. Each upright 36 is a rectangular, vertical planar member. Each upright 36 has two vertical edges. One vertical edge of each upright 36 is joined to cylinder 32. An opposite vertical edge of upright 36 is joined to a crosspiece 38. Each crosspiece 38 is a rectangular, vertical planar member. Each upright 36 is joined to an inward side of a cross piece 38. The outward side of each crosspiece 38 is a wall section 15 of body 30.

Each crosspiece 38 has two vertical edges. Near each vertical edge of each crosspiece 38, a member 40 extends from the inward side of crosspiece 38. Members 40 and crosspieces 38 define vertical slots 42.

Each slot 42 allows vertical inserts 44 to be engaged by central piece 31. Inserts 44 each define a hollow vertical member 12. Each insert 44 includes a wall 13 having four circular apertures 14.

Additional features of vertical members 12 will now be discussed. Along a lower portion of the perimeter of each aperture 14, wall 13 protrudes inward. Each such inward protrusion of wall 13 defines a shelf 46. Shelf 46 may best be seen with reference to FIG. 5. The purpose of the shelf 46 is to support a cylindrical object, such as a jar. A jar 150 is shown in dotted lines in FIGS. 3 and 5. Jar 150 illustrates the placement of a jar in a circular aperture 14 of unit 10. However, jar 150 forms no part of unit 10. Each shelf 46 is tilted slightly upward toward the outside of the unit 10. This tilt serves the purpose of assuring that jar 150 does not fall out. The tilt is kept small so as to maximize the use of the space in the interior of each vertical member 12. By way of example, an angle of six degrees from horizontal may be provided.

Referring to FIG. 3, it will be seen that the outside of central cylinder 32 of body 30 has substantially planar surfaces 66. Each planar surface 66 extends the height of cylinder 30 and is substantially rectangular. Each planar surface 66 is aligned with a vertical member 12. The distance between aperture 14 and surface 66 is selected so that, as can be seen in FIG. 3, when jar 150 is inserted in an aperture 14 the bottom of a jar 150 rests against planar surface 66.

Referring to FIG. 5, it will be seen that cylinder 32 includes circular floor member 68. Circular floor member 68 provides a floor of receptacle 18. As a result, utensils, such as spoons, may protrude over the top of unit 10. This makes it easy for such utensils to be viewed and removed.

Platform 50 is shown in FIG. 3. Tabs 52 extend vertically upward from platform 50. Each tab 52 is a substantially rectangular planar member. Pairs of tabs 52 are arranged parallel to one another so as to engage each upright 36 of each member 34. Platform 50 is shown in cross-section in FIG. 5. Two tabs 52 are visible projecting upward from platform 50. FIG. 4 shows tabs 52 in cross-section. An adhesive material 54 is provided to assure a permanent, rigid connection between tabs 52 and uprights 36. In this manner, platform 50 is rigidly and permanently secured to body 30.

With reference to FIG. 5, it will be seen that platform 50 is rotatably mounted on base 56. It may also be stated that body 30 is rotatably mounted on base 56.

Extending from the center of a lower surface of platform 50 there is an open cylinder 55.

Details of the construction of base 56 may be seen with reference to FIG. 5. Base 56 has a central circular plate 80. Radially outward from the perimeter of the circular plate 80 is a trough 84. The trough 84 is circular. In cross-section trough 80 appears as a rectangle open at the top. The inner wall 86 of trough 84 is attached to the perimeter of circular plate 80. At the bottom of the lower wall 88 of trough 84 is a downward depending circular foot 89 having a rectangular cross-section The unit rests on circular foot 89.

Base 56 includes bearings 58. A bearing 58 may be a conventional ball bearing. Each bearing 58 is mounted in a pocket 60, mounted on circular plate 80, so as to rotate freely. The depth of each pocket 60 is less than a diameter of bearing 58.

The center of circular plate 80 has, about its center, an upward projecting member defining a cylinder 90 coaxial with the circular plate. Extending inward from the cylinder 90 is a ring-shaped projection 92. Cylinder 90 and projection 92 define a support member 66. Attached to the lower side of projection 92 is cylindrical chamber 62. The height of support member above circular plate 80 is less than the height of the top of bearings 58. The inner diameter of chamber 62 is the same as or very slightly greater than the outer diameter of cylinder 55, which, as noted, extends from a lower surface of platform 50.

Cylinder 55 is inserted into chamber 62. When cylinder 55 is inserted into chamber 62, the platform 50 will be supported by bearings 58. As a result, platform 50 may rotate on base 56.

FIG. 5 also shows top 70. Top 70 is a disk-like member having an opening in the center thereof. The inner edge 71 of top 70 is designed to engage an upper edge 33 of cylinder 32. Top 70 also engages an upper edge of each vertical member 12. Tabs 72 depend downward from a lower surface of top 70. Each tab 72 is a rectangular vertical planar member. Tabs 72 are positioned in pairs. Each pair is located so as to engage a planar upright 36. Thus tabs 72 help maintain top 70 in place secured to body 30.

It will be appreciated that there are considerable variations that can be accomplished in an article of the invention without departing from its scope. As a result, although a preferred embodiment of an article according to the invention has been described above, it is emphasized that the invention is not limited to a preferred embodiment and there exists alternative embodiments that are fully encompassed with the invention's scope, which is intended to be limited only by the scope of the appended claims.

What is claimed is:

1. A kitchen storage unit, comprising:
    (a) a body having an interior volume;
    (b) a plurality of vertical members disposed about a perimeter of said body, each one of said vertical members including one or a plurality of apertures for receiving containers;
    (c) a plurality of pegs extending from an upper portion of said body, wherein no portion of any one of said apertures in said vertical members is directly beneath any one of said pegs; and
    (d) a receptacle formed centrally in said body and having an opening defined by a hole in a top surface of said body, whereby items may be received in said receptacle and protrude above said top surface of said body and having a wall defining an interior space within said interior volume, and said wall having an exterior surface, said exterior surface of said receptacle being inward of said apertures, an unobstructed passage extending between each of said apertures and said exterior surface of said receptacle being selected so that said exterior surface of said receptacle and each of said apertures form a support for a container, said passage having a distance between the aperture and the exterior surface of said receptacle.

2. A kitchen storage unit as recited on claim 1, further comprising a base, and wherein said body is rotatably mounted on said base.

3. A kitchen storage unit as recited in claim 1, wherein each one of said vertical members extends substantially the entire height of said body.

4. A kitchen storage unit as recited in claim 1, wherein said vertical members are located equidistant from one another about a perimeter of said body.

5. A kitchen storage unit as recited in claim 4, wherein between any two of said vertical members said body has a substantially vertical, planar wall.

6. A kitchen storage unit as recited in claim 5, wherein said pegs extend from an upper portion of said substantially vertical, planar wall of said body.

7. A kitchen storage unit as recited in claim 5, wherein each one of said substantially vertical planar walls is spaced radially outward from said receptacle a distance less than said distance between each of said apertures and said exterior surface of said receptacle.

8. A kitchen storage unit as recited in claim 1, wherein each one of said aperture is circular.

9. A kitchen storage unit as recited in claim 1, wherein each one of said vertical members comprises a wall in which said apertures are formed and said wall of each of said vertical members protrudes inward along a lower portion of a perimeter of each of said apertures, so as to define a shelf.

10. A kitchen storage unit as recited in claim 1, wherein, inward of each one of said apertures, there is provided on said exterior surface of said receptacle, a substantially vertical planar surface.

11. A kitchen storage unit as recited in claim 10, wherein each one of said vertical members comprises a wall in which said apertures are formed, and said wall of each of said vertical members protrudes inward along a lower portion of a perimeter of each of said apertures so as to define a shelf.

12. A kitchen storage unit as recited in claim 10, wherein each of said apertures for receiving containers is circular.

13. A kitchen storage unit as recited in claim 1, wherein each of said pegs extends from an upper portion of said body intermediate between two of said vertical members.

14. A kitchen storage unit as recited in claim 1, wherein at least one of said pegs extends from a wall of one of said vertical members.

15. A kitchen storage unit as recited in claim 1, wherein:
(a) said kitchen storage unit further comprises a base, and wherein said body is rotatably mounted on said base;
(b) each one of said vertical members extends substantially the entire height of said body;
(c) said vertical members are located equidistant from one another about a perimeter of said body;
(d) each one of said apertures for receiving containers is circular; and
(e) a radial distance from an outer end of each one of said pegs to a center of said body is less than a radial distance from an outermost point of each of said vertical members to a center of said body.

16. A kitchen storage unit as recited in claim 15, wherein, inward of each one of said apertures, there is provided on said exterior surface of said receptacle a substantially vertical planar surface.

17. A kitchen storage unit as recited in claim 15, wherein each one of said vertical members further comprises a wall and said wall of each of said vertical members protrudes inward along a lower portion of a perimeter of each of said apertures, so as to define a shelf.

18. A kitchen storage unit as recited in claim 17, wherein, inward of each one of said apertures, there is provided on said exterior surface of said receptacle a substantially vertical planar surface.

19. A kitchen storage unit as recited in claim 18, wherein, between any two of said vertical members, said body has a substantially vertical, planar wall.

20. A kitchen storage unit as recited in claim 19, wherein said pegs extend from an upper portion of said substantially vertical planar wall of said body.

* * * * *